US012080471B2

(12) United States Patent
Urabe et al.

(10) Patent No.: US 12,080,471 B2
(45) Date of Patent: Sep. 3, 2024

(54) COIL COMPONENT

(71) Applicant: TDK CORPORATION, Tokyo (JP)

(72) Inventors: Junichiro Urabe, Tokyo (JP); Hajime Kato, Tokyo (JP); Yuto Shiga, Tokyo (JP); Kazuya Tobita, Tokyo (JP); Youichi Kazuta, Tokyo (JP); Noriaki Hamachi, Tokyo (JP); Toshinori Matsuura, Tokyo (JP); Yuichi Takubo, Tokyo (JP); Asami Takahashi, Tokyo (JP); Munehiro Takaku, Tokyo (JP)

(73) Assignee: TDK CORPORATION, Tokyo (JP)

( * ) Notice: Subject to any disclaimer, the term of this patent is extended or adjusted under 35 U.S.C. 154(b) by 547 days.

(21) Appl. No.: 17/166,153

(22) Filed: Feb. 3, 2021

(65) Prior Publication Data

US 2021/0249183 A1 Aug. 12, 2021

(30) Foreign Application Priority Data

Feb. 7, 2020 (JP) ................................ 2020-020114

(51) Int. Cl.
*H01F 27/29* (2006.01)
*H01F 17/00* (2006.01)
*H01F 27/28* (2006.01)

(52) U.S. Cl.
CPC ....... *H01F 27/292* (2013.01); *H01F 17/0006* (2013.01); *H01F 27/2847* (2013.01); *H01F 2017/0073* (2013.01)

(58) Field of Classification Search
CPC ............... H01F 27/292; H01F 17/0013; H01F 27/2804; H01F 2027/2809; H01F 27/29; H01F 5/04; H01F 41/041; H01F 17/02; H01F 2017/0073; H01F 27/323; H01F 27/34; H01F 2017/004; H01F 17/0006; H01F 17/0033; H01F 27/245; H01F 27/2847; H01F 5/00
See application file for complete search history.

(56) References Cited

U.S. PATENT DOCUMENTS

2014/0145815 A1* 5/2014 Ishii ..................... H01F 27/292 336/200
2014/0224418 A1 8/2014 Seko
(Continued)

FOREIGN PATENT DOCUMENTS

JP H09-129458 A 5/1997
JP 2014-107513 A 6/2014
(Continued)

*Primary Examiner* — Malcolm Barnes
(74) *Attorney, Agent, or Firm* — Oliff PLC

(57) ABSTRACT

In a coil 5 of a multilayer coil component 1, an end portion 6*a* of a turn 6 closest to a side surface 2*e* in the facing direction of the side surface 2*e* and a side surface 2*f* is connected to a first external electrode 3 and an end portion 11*a* of a turn 11 closest to the side surface 2*f* in the facing direction is connected to a second external electrode 4. When viewed from the facing direction, the area of the region where the turn 6 and the second external electrode 4 face each other and the area of the region where the turn 11 and the first external electrode 3 face each other are larger than the area of the region where turns other than the turn 6 and the turn 11 and the first external electrode 3 or the second external electrode 4 face each other.

3 Claims, 13 Drawing Sheets

(56) References Cited

U.S. PATENT DOCUMENTS

| | | | | |
|---|---|---|---|---|
| 2019/0103209 | A1* | 4/2019 | Nagano | H01F 1/20 |
| 2019/0362884 | A1* | 11/2019 | Kwon | H01F 27/292 |
| 2021/0272734 | A1 | 9/2021 | Nagano et al. | |

FOREIGN PATENT DOCUMENTS

| | | | |
|---|---|---|---|
| JP | 2014-154716 | A | 8/2014 |
| JP | 2019-67870 | A | 4/2019 |

* cited by examiner

COIL COMPONENT

TECHNICAL FIELD

The present invention relates to a coil component.

BACKGROUND

The coil component that is described in Patent Literature 1 (Japanese Unexamined Patent Publication No. 2014-154716) is known as an example of coil components. The coil component described in Patent Literature 1 includes an element body including a pair of end surfaces facing each other, a pair of main surfaces facing each other, and a pair of side surfaces facing each other, a coil disposed in the element body, having a coil axis extending along the facing direction of the pair of side surfaces, and configured to include a plurality of turns, and a pair of external electrodes to which the coil is connected. In the coil, an end portion of the turn closest to one of the side surfaces in the facing direction of the pair of side surfaces is connected to one of the external electrodes and an end portion of the turn closest to the other side surface is connected to the other external electrode.

SUMMARY

In the coil component, the turn of the coil connected to one external electrode (the other external electrode) has a large potential difference at the part facing the other external electrode (one external electrode). Accordingly, electric field concentration occurs at the part of the turn facing the other external electrode (one external electrode). As a result, in the coil component, the parasitic capacitance (stray capacitance) generated between the turn of the coil and the external electrode increases, and thus the self-resonant frequency (SRF) decreases and the quality factor (Q) value also decreases in coil characteristics.

An object of one aspect of the present invention is to provide a coil component with which it is possible to improve the Q value while increasing the self-resonant frequency.

A coil component according to one aspect of the present invention includes an element body including a pair of end surfaces facing each other, a pair of main surfaces facing each other, and a pair of side surfaces facing each other, a coil disposed in the element body, having a coil axis extending along a facing direction of the pair of side surfaces, and including a plurality of turns having a constant width, and a first external electrode to which one end of the coil is connected and a second external electrode to which the other end of the coil is connected. Each of the first external electrode and the second external electrode is disposed on at least one of the main surfaces and the first external electrode and the second external electrode are separated from each other in a facing direction of the pair of end surfaces, an end portion of a first outermost turn as the turn closest to one of the side surfaces in the facing direction of the pair of side surfaces is connected to the first external electrode and an end portion of a second outermost turn as the turn closest to the other side surface in the facing direction of the pair of side surfaces is connected to the second external electrode in the coil, and an area of a region where the first outermost turn and the second external electrode face each other and an area of a region where the second outermost turn and the first external electrode face each other are larger than an area of a region where the turns other than the first outermost turn and the second outermost turn and the first external electrode or the second external electrode face each other when viewed from the facing direction of the pair of side surfaces.

In the coil component according to one aspect of the present invention, the area of the region where the first outermost turn and the second external electrode face each other and the area of the region where the second outermost turn and the first external electrode face each other are larger than the area of the region where the turns other than the first outermost turn and the second outermost turn and the first external electrode or the second external electrode face each other when viewed from the facing direction of the pair of side surfaces. As a result, in the coil component, the first outermost turn and the second external electrode can be separated from each other and the second outermost turn and the first external electrode can be separated from each other. Accordingly, in the coil component, the parasitic capacitance that is generated between the first outermost turn and the second external electrode and between the second outermost turn and the first external electrode can be reduced. As a result, in the coil component, it is possible to improve the Q value while increasing the self-resonant frequency.

In one embodiment, a part where the first outermost turn faces the second external electrode and a part where the second outermost turn faces the first external electrode may have a curved shape when viewed from the facing direction of the pair of side surfaces. In this configuration, it is possible to separate the first and second outermost turns from the external electrodes while increasing the inner diameters of the first outermost turn and the second outermost turn. Accordingly, the Q value can be improved in the coil component.

In one embodiment, each of the first external electrode and the second external electrode may be disposed only on one of the main surfaces. In this configuration, the parasitic capacitance that is formed between the first outermost turn and the second external electrode and between the second outermost turn and the first external electrode can be reduced. Accordingly, in the coil component, it is possible to improve the Q value while increasing the self-resonant frequency.

According to one aspect of the present invention, it is possible to improve the Q value while increasing the self-resonant frequency.

DETAILED DESCRIPTION

Figure 1:
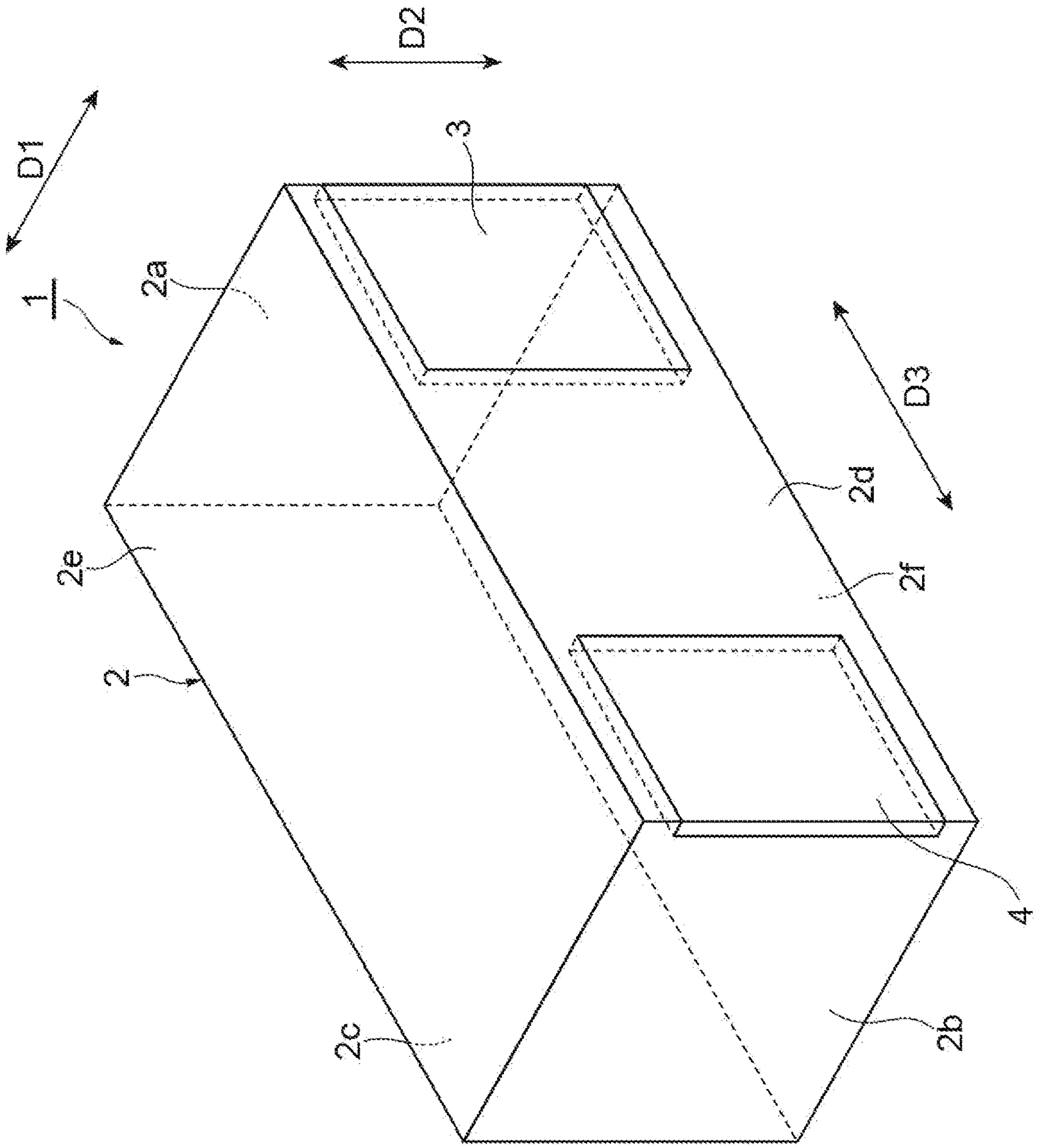
FIG. 1 is a perspective view illustrating a multilayer coil component according to a first embodiment.

Hereinafter, preferred embodiments of the present invention will be described in detail with reference to the accompanying drawings. In the description of the drawings, the same or equivalent elements are denoted by the same reference numerals with redundant description omitted.

First Embodiment

As illustrated in FIG. 1, a multilayer coil component 1 includes an element body 2 having a rectangular parallelepiped shape, a first external electrode 3, and a second external electrode 4. The first external electrode 3 and the second external electrode 4 are disposed in both end portions of the element body 2, respectively. The rectangular parallelepiped shape includes a rectangular parallelepiped shape in which corner and ridgeline portions are chamfered and a rectangular parallelepiped shape in which corner and ridgeline portions are rounded.

The element body 2 has a pair of end surfaces 2*a* and 2*b* facing each other, a pair of main surfaces 2*c* and 2*d* facing each other, and a pair of side surfaces 2*e* and 2*f* facing each other. The facing direction of the pair of main surfaces 2*c* and 2*d*, that is, the direction parallel to the end surfaces 2*a* and 2*b* is a first direction D1. The facing direction of the pair of side surfaces 2*e* and 2*f* is a second direction D2. The facing direction of the pair of end surfaces 2*a* and 2*b*, that is, the direction parallel to the main surfaces 2*c* and 2*d* is a third direction D3. In the present embodiment, the first direction D1 is the height direction of the element body 2. The second direction D2 is the width direction of the element body 2 and is orthogonal to the first direction D1. The third direction D3 is the longitudinal direction of the element body 2 and is orthogonal to the first direction D1 and the second direction D2.

The pair of end surfaces 2*a* and 2*b* extend in the first direction D1 so as to interconnect the pair of main surfaces 2*c* and 2*d*. The pair of end surfaces 2*a* and 2*b* also extend in the second direction D2, that is, the short side direction of the pair of main surfaces 2*c* and 2*d*. The pair of side surfaces 2*e* and 2*f* extend in the first direction D1 so as to interconnect the pair of main surfaces 2*c* and 2*d*. The pair of side surfaces 2*e* and 2*f* also extend in the third direction D3, that is, the long side direction of the pair of end surfaces 2*a* and 2*b*. The multilayer coil component 1 is, for example, solder-mounted on an electronic device (such as a circuit board and an electronic component). In the multilayer coil component 1, the main surface (one main surface) 2*d* constitutes a mounting surface facing the electronic device.

The element body 2 is configured by stacking a plurality of dielectric layers in the second direction D2. The element body 2 has the plurality of stacked dielectric layers. In the element body 2, the direction in which the plurality of dielectric layers are stacked coincides with the second direction D2. In the actual element body 2, each dielectric layer is integrated to the extent that the boundary between the dielectric layers cannot be visually recognized. Each dielectric layer is formed of a dielectric material containing a glass component. In other words, the element body 2 contains a dielectric material containing a glass component as a compound of elements constituting the element body 2. The glass component is, for example, borosilicate glass. The dielectric material is, for example, dielectric ceramic such as $BaTiO_3$-based dielectric ceramic, $Ba(Ti,Zr)O_3$-based dielectric ceramic, and $(Ba,Ca)TiO_3$-based dielectric ceramic. Each dielectric layer is made of a sintered body of a ceramic green sheet containing a glass ceramic material. It should be noted that each dielectric layer may be made of a magnetic material. The magnetic material includes, for example, a Ni—Cu—Zn-based ferrite material, a Ni—Cu—Zn—Mg-based ferrite material, or a Ni—Cu-based ferrite material. The magnetic material constituting each dielectric layer may contain an Fe alloy. Each dielectric layer may be made of a nonmagnetic material. The nonmagnetic material includes, for example, a glass ceramic material or a dielectric material.

As illustrated in FIG. 1, each of the first external electrode 3 and the second external electrode 4 is disposed on the main surface 2*d* of the element body 2. Each of the first external electrode 3 and the second external electrode 4 is embedded in the element body 2. The first external electrode 3 and the second external electrode 4 are separated from each other in the third direction D3.

The first external electrode 3 is disposed on the end surface 2*a* side. The second external electrode 4 is disposed on the end surface 2*b* side. Each of the first external electrode 3 and the second external electrode 4 has a rectangular shape when viewed from the first direction D1. The first external electrode 3 and the second external electrode 4 are formed to have the same size. The first external electrode 3 and the second external electrode 4 extend along the second direction D2 and the third direction D3. In the present embodiment, the surface of the first external electrode 3 is substantially flush with the main surface 2*d*. The surface of the second external electrode 4 is substantially flush with the main surface 2*d*.

The first external electrode 3 and the second external electrode 4 contain a conductive material. The conductive material contains, for example, Ag or Pd. The first external electrode 3 and the second external electrode 4 are configured as a sintered body of conductive paste containing conductive material powder. The conductive material powder includes, for example, Ag powder or Pd powder. A plating layer may be formed on the surfaces of the first external electrode 3 and the second external electrode 4. The plating layer is formed by, for example, electroplating or electroless plating. The plating layer contains, for example, Ni, Sn, or Au.

Each of the first external electrode 3 and the second external electrode 4 is configured by stacking a plurality of electrode layers (not illustrated). The electrode layer has a rectangular shape when viewed from the second direction D2. Each electrode layer is provided in a defect portion formed in the corresponding dielectric layer. The electrode layer is formed by firing conductive paste positioned in a defect portion formed on a green sheet. The green sheet and the conductive paste are fired at the same time. Accordingly, the electrode layer is obtained from the conductive paste when the dielectric layer is obtained from the green sheet. In the actual first external electrode, each electrode layer is integrated to the extent that the boundary between the electrode layers cannot be visually recognized.

Figure 2:
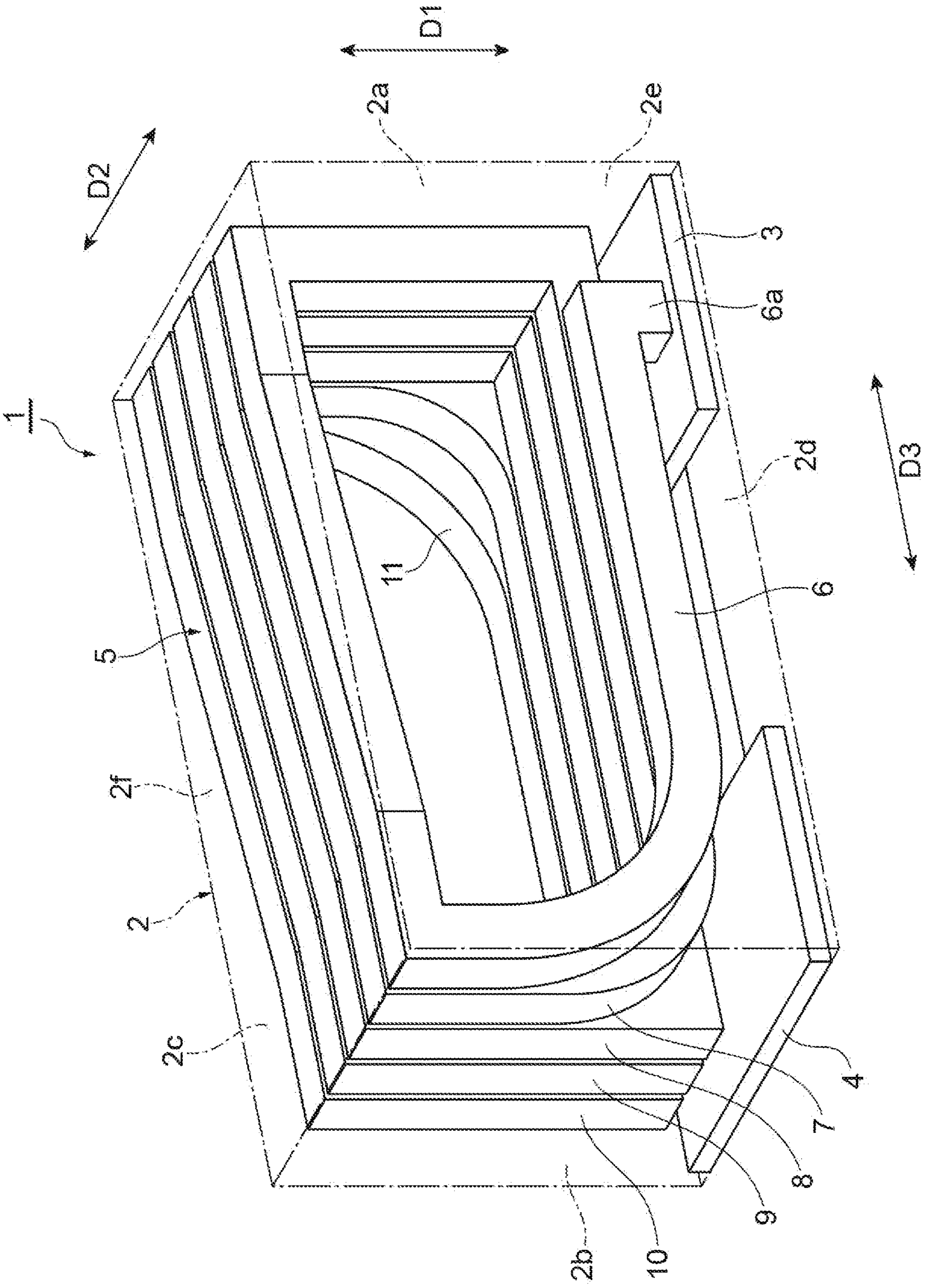
FIG. 2 is a perspective view illustrating the internal configuration of the multilayer coil component illustrated in FIG. 1.
Figure 3:
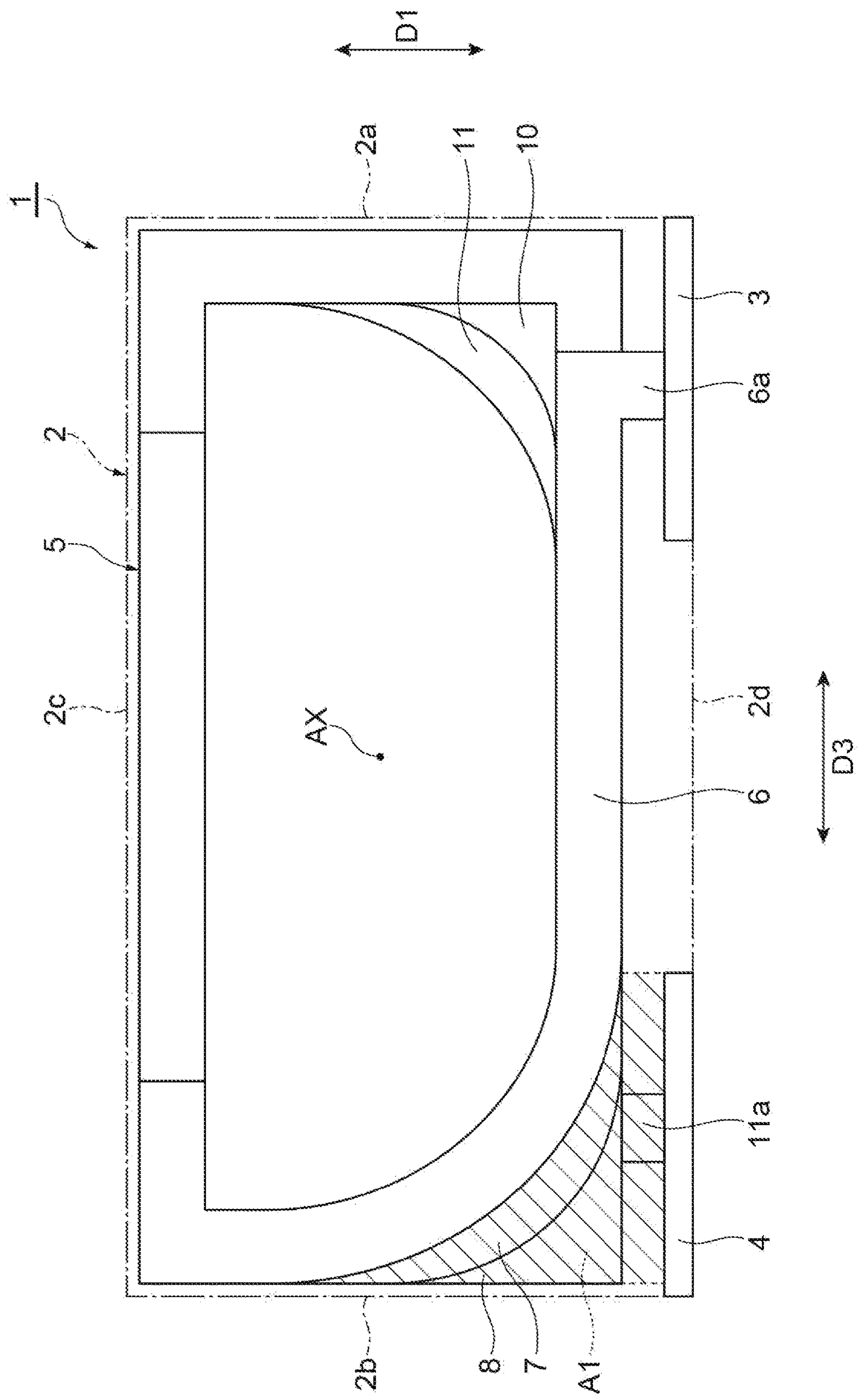
FIG. 3 is a side view illustrating the internal configuration of the multilayer coil component illustrated in FIG. 1.
Figure 4:
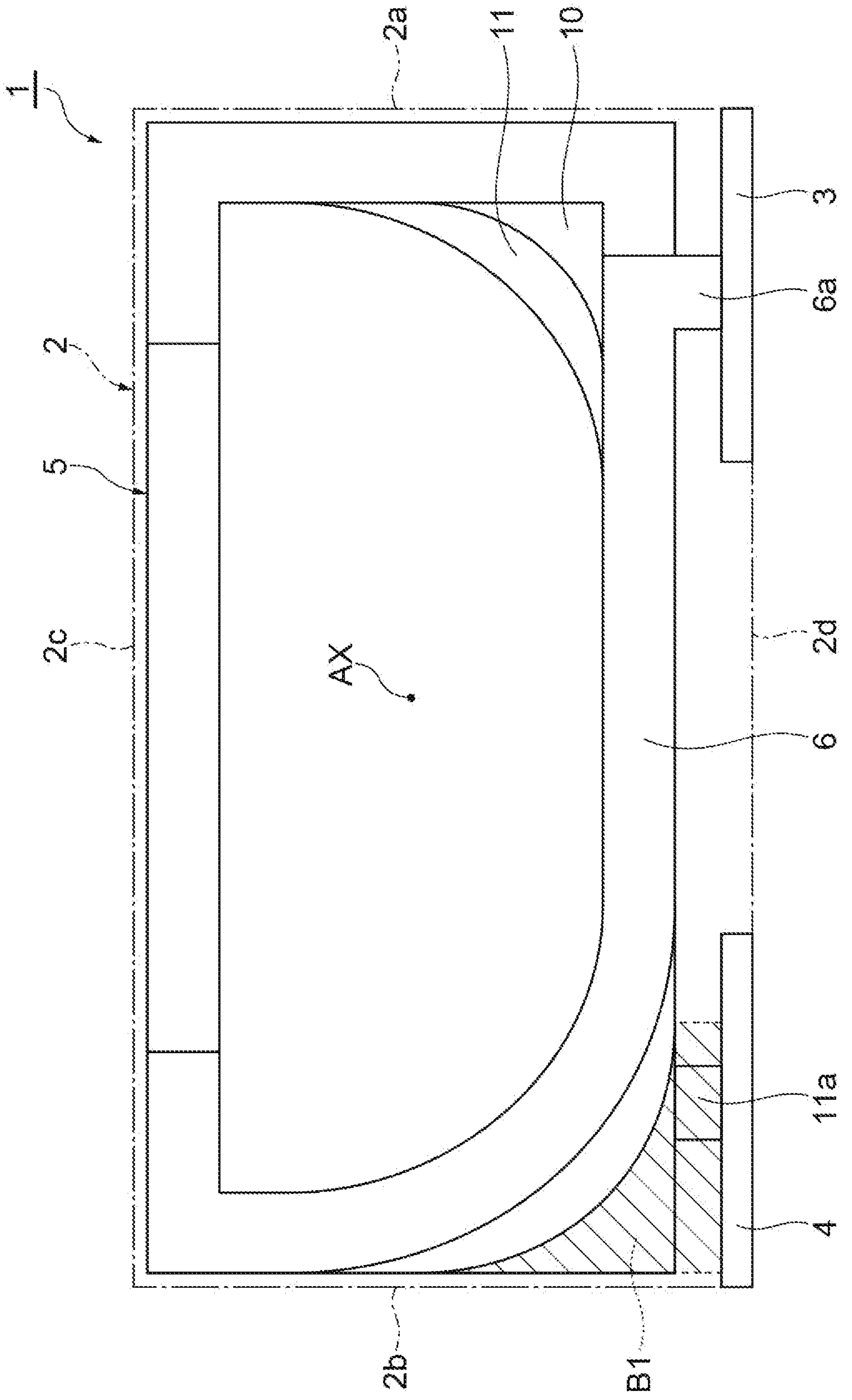
FIG. 4 is a side view illustrating the internal configuration of the multilayer coil component illustrated in FIG. 1.

The multilayer coil component 1 includes a coil 5 disposed in the element body 2 as illustrated in FIGS. 2, 3, and 4. A coil axis AX of the coil 5 extends along the second direction D2. One end of the coil 5 is connected to the first external electrode 3, and the other end of the coil 5 is connected to the second external electrode 4. The coil 5 is configured to include a plurality of turns 6, 7, 8, 9, 10, and 11. Each of the turns 6, 7, 8, 9, 10, and 11 is formed by a coil conductor (coil portion).

In the coil 5, the turn 6, the turn 7, the turn 8, the turn 9, the turn 10, and the turn 11 are disposed in this order between the side surface 2*e* and the side surface 2*f*. The turn 7, the turn 8, the turn 9, and the turn 10 are disposed between the turn 6 and the turn 11. The turn 6, the turn 7, the turn 8, the turn 9, the turn 10, and the turn 11 have a constant width. In other words, the turn 6, the turn 7, the turn 8, the turn 9, the turn 10, and the turn 11 are formed to have the same width.

The turn 6 is the first outermost turn that is closest to the side surface 2*e* (one side surface) in the second direction D2. An end portion 6*a* of the turn 6 is connected to the first external electrode 3. As a result, the coil 5 is connected to the first external electrode 3. As illustrated in FIG. 3, the part of the turn 6 that faces the second external electrode 4 in the first direction D1 has a curved shape when viewed from the second direction D2. When viewed from the second direction D2, the part of the turn 6 that faces the second external electrode 4 is curved in a convex shape in the direction from the coil axis AX to the outside. The part has a predetermined radius of curvature.

The turn 7 is connected to the turn 6. When viewed from the second direction D2, the part of the turn 7 that faces the second external electrode 4 has a curved shape. The outer edge of the turn 7 is positioned outside the outer edge of the turn 6 when viewed from the second direction D2. The turn 8 is connected to the turn 7. The turn 9 is connected to the turn 8. The turn 10 is connected to the turn 9. When viewed from the second direction D2, the part of the turn 10 that faces the second external electrode 4 has a curved shape. The outer edge of the turn 10 is positioned outside the outer edge of the turn 11 when viewed from the second direction D2.

The turn 11 is the second outermost turn that is closest to the side surface 2*f* (the other side surface) in the second direction D2. An end portion 11*a* of the turn 11 is connected to the second external electrode 4. As a result, the coil 5 is connected to the second external electrode 4. When viewed from the second direction D2, the part of the turn 11 that faces the first external electrode 3 has a curved shape. When viewed from the second direction D2, the part of the turn 11 that faces the first external electrode 3 is curved in a convex shape in the direction from the coil axis AX to the outside.

In the multilayer coil component 1, the area of the region where the turn 6 and the second external electrode 4 face each other and the area of the region where the turn 11 and the first external electrode 3 face each other are larger than the area of the region where the turns 7, 8, 9, and 10 other than the turn 6 and the turn 11 and the first external electrode 3 or the second external electrode 4 face each other when viewed from the second direction D2. In the multilayer coil component 1, the relationship of A1>B1 is satisfied in a case where the area of the region where the turn 6 and the second external electrode 4 face each other when viewed from the second direction D2 is "A1" as illustrated in FIG. 3 and the area of the region where the turn 7 and the second external electrode 4 face each other when viewed from the second direction D2 is "B1" as illustrated in FIG. 4.

Likewise, in the multilayer coil component 1, the relationship of A1>B1 is satisfied in a case where the area of the region where the turn 11 and the first external electrode 3 face each other when viewed from the second direction D2 is "A1" and the area of the region where the turn 10 and the first external electrode 3 face each other when viewed from the second direction D2 is "B1". The same applies to a case where the area of the region where the turns 8 and 9 and the first external electrode 3 or the second external electrode 4 face each other is "B1". In the multilayer coil component 1, the distance between the turn 6 and the second external electrode 4 in the first direction D1 is greater than the distance between the turns 7, 8, 9, and 10 and the second external electrode 4 in the first direction D1. In other words, the turn 6 is more distant from the second external electrode 4 in the first direction D1 than the turns 7, 8, 9, and 10. In the present embodiment, the distance between the turn 7 and the second external electrode 4 in the first direction D1 is greater than the distance between the turns 8, 9, and 10 and the second external electrode 4 in the first direction D1.

In the multilayer coil component 1, the distance between the turn 11 and the first external electrode 3 in the first direction D1 is greater than the distance between the turns 7, 8, 9, and 10 and the first external electrode 3 in the first direction D1. In other words, the turn 11 is more distant from the first external electrode 3 in the first direction D1 than the turns 7, 8, 9, and 10. In the present embodiment, the distance between the turn 10 and the first external electrode 3 in the first direction D1 is greater than the distance between the turns 7, 8, and 9 and the first external electrode 3 in the first direction D1.

The plurality of turns 6, 7, 8, 9, 10, and 11 contain a conductive material. The conductive material contains Ag or Pd. The plurality of turns 6, 7, 8, 9, 10, and 11 are configured as a sintered body of conductive paste containing conductive material powder. The conductive material powder includes, for example, Ag powder or Pd powder. In the present embodiment, the plurality of turns 6, 7, 8, 9, 10, and 11 contain the same conductive material as the first external electrode 3 and the second external electrode 4. The plurality of turns 6, 7, 8, 9, 10, and 11 may contain a conductive material different from the conductive material of the first external electrode 3 and the second external electrode 4.

The plurality of turns 6, 7, 8, 9, 10, and 11 are provided in defect portions formed in the corresponding dielectric layers. The plurality of turns 6, 7, 8, 9, 10, and 11 are formed by firing conductive paste positioned in a defect portion formed on a green sheet. As described above, the green sheet and the conductive paste are fired at the same time. Accordingly, the plurality of turns 6, 7, 8, 9, 10, and 11 are obtained from the conductive paste when the dielectric layers are obtained from the green sheet.

The defect portion formed on the green sheet is formed by, for example, the following process. First, the green sheet is formed by applying element body paste containing a constituent material of a dielectric layer and a photosensitive material onto a base material. The base material is, for example, a PET film. The photosensitive material contained in the element body paste may be either a negative-type photosensitive material or a positive-type photosensitive material and known photosensitive materials can be used. Next, the green sheet is exposed and developed by a photolithography method and by means of a mask corresponding to the defect portion, and then the defect portion is formed on the green sheet on the base material. The green sheet on which the defect portion is formed is an element body pattern.

The plurality of turns 6, 7, 8, 9, 10, and 11 are formed by, for example, the following process. First, a conductor material layer is formed by applying conductive paste containing a photosensitive material onto a base material. The photosensitive material contained in the conductive paste may be either a negative-type photosensitive material or a positive-type photosensitive material and known photosensitive materials can be used. Next, the conductor material layer is exposed and developed by a photolithography method and by means of a mask corresponding to the defect portion, and then a conductor pattern corresponding to the shape of the defect portion is formed on the base material.

The multilayer coil component 1 is obtained by, for example, the following process following the process described above. A sheet in which the element body pattern and the conductor pattern are in the same layer is prepared by combining the conductor pattern with the defect portion of the element body pattern. A predetermined number of the sheets are prepared, a stacked body is obtained by stacking the sheets, and the stacked body is heat-treated. Then, a plurality of green chips are obtained from the stacked body. In this process, the green stacked body is cut into chips by means of, for example, a cutting machine. As a result, the plurality of green chips having a predetermined size can be obtained. Next, the green chips are fired. The multilayer coil component 1 is obtained as a result of the firing. In the multilayer coil component 1, the first external electrode 3, the second external electrode 4, and the coil 5 are integrally formed.

As described above, in the multilayer coil component 1 according to the present embodiment, the area of the region where the turn 6 (first outermost turn) and the second external electrode 4 face each other and the area of the region where the turn 11 (second outermost turn) and the first external electrode 3 face each other are larger than the area of the region where the turns 7, 8, 9, and 10 other than the turn 6 and the turn 11 and the first external electrode 3 or the second external electrode 4 face each other when viewed from the facing direction of the pair of side surfaces 2*e* and 2*f* (second direction D2). As a result, in the multilayer coil component 1, the turn 6 and the second external electrode 4 can be separated from each other and the turn 11 and the first external electrode 3 can be separated from each other. Accordingly, in the multilayer coil component 1, the parasitic capacitance that is generated between the turn 6 and the second external electrode 4 and between the turn 11 and the first external electrode 3 can be reduced. As a result, in the multilayer coil component 1, it is possible to improve the Q value while increasing the self-resonant frequency.

Figure 5:
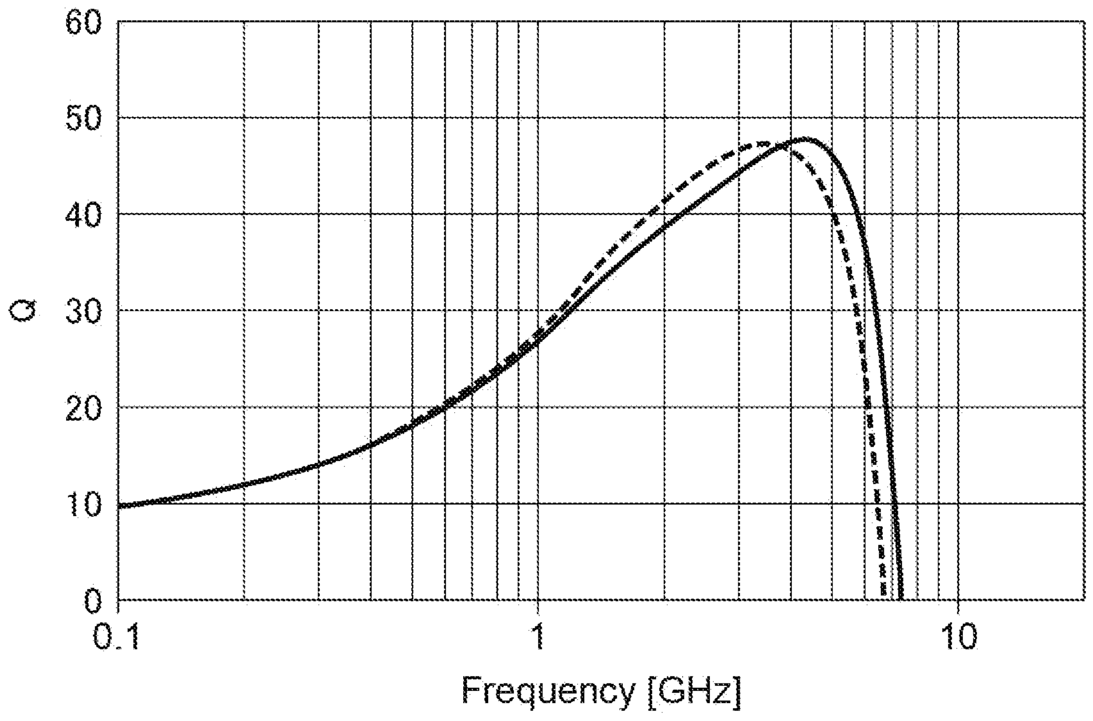
FIG. 5 is a graph showing a frequency-Q value relationship.

In FIG. 5, the horizontal axis is the frequency [GHz] and the vertical axis is the Q value. In FIG. 5, the characteristics of the multilayer coil component 1 are indicated by a solid line and the characteristics of the multilayer coil component of a comparative example are indicated by a dashed line. In the multilayer coil component of the comparative example, the area of the region where the first outermost turn and the second external electrode face each other and the area of the region where the second outermost turn and the first external electrode face each other are equal to the area of the region where the turns other than the first outermost turn and the second outermost turn and the first external electrode or the second external electrode face each other when viewed from the facing direction of the pair of side surfaces. In other words, in the multilayer coil component according to the comparative example, every turn has the same shape as, for example, the turn 8 and the coil has a rectangular frame shape when viewed from the facing direction of the pair of side surfaces.

As illustrated in FIG. 5, in the multilayer coil component 1, the self-resonant frequency is higher, without a significant Q value decline, than in the multilayer coil component according to the comparative example. Accordingly, in the multilayer coil component 1, it is possible to improve the Q value while increasing the self-resonant frequency.

In the multilayer coil component 1 according to the present embodiment, the part where the turn 6 faces the second external electrode 4 and the part where the turn 11 faces the first external electrode 3 have a curved shape when viewed from the facing direction of the pair of side surfaces 2*e* and 2*f*. In this configuration, it is possible to separate the turn 6 and the second external electrode 4 from each other and separate the turn 11 and the first external electrode 3 from each other while increasing the inner diameters of the turn 6 and the turn 11. Accordingly, the Q value can be improved in the multilayer coil component 1.

Figure 6:
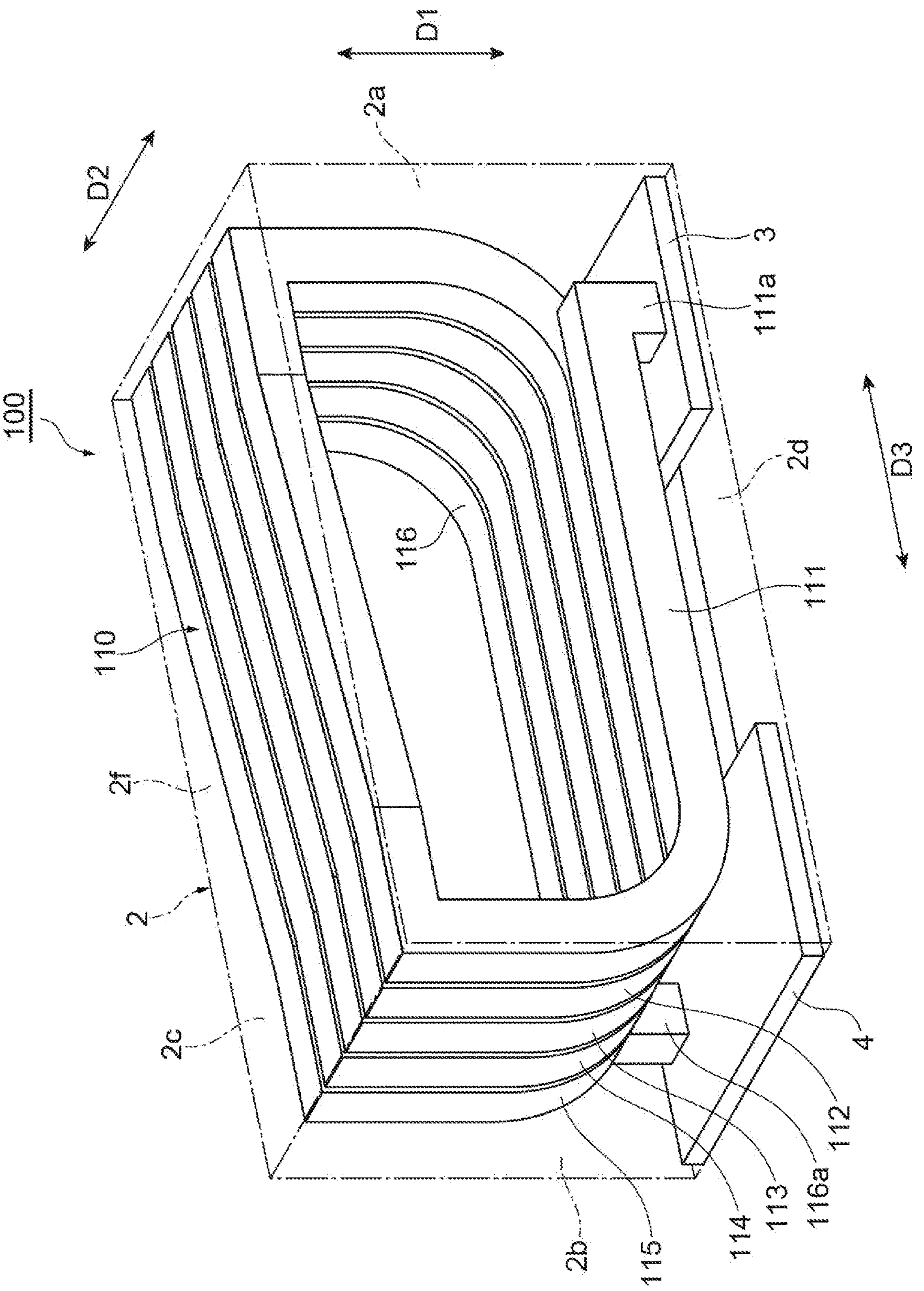
FIG. 6 is a perspective view illustrating the internal configuration of a multilayer coil component according to a comparative example.

Conceivable here is a multilayer coil component 100 illustrated in FIG. 6, in which the part of every turn 111, 112, 113, 114, 115, and 116 of a coil 110 that faces the first external electrode 3 or the second external electrode 4 has a curved shape. In other words, in the multilayer coil component 100, not only the turn 111 as the first outermost turn having an end portion 111*a* connected to the first external electrode 3 and the turn 116 as the second outermost turn having an end portion 116*a* connected to the second external electrode 4 but also the turns 112, 113, 114, and 115 are separated from the first external electrode 3 or the second external electrode 4. As a result, in the multilayer coil component 100, the parasitic capacitance that is generated between the coil 110 and the first external electrode 3 or the second external electrode 4 can be reduced. However, the coil 110 of the multilayer coil component 100 is smaller in inner diameter than the coil 5 of the multilayer coil component 1.

Figure 7:
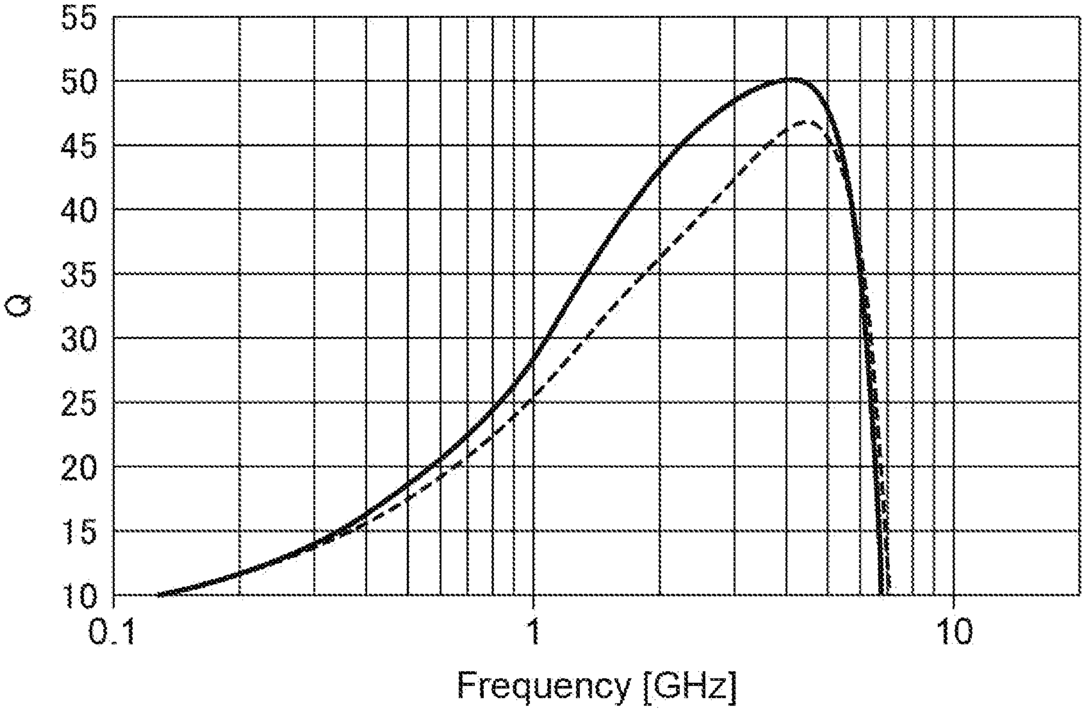
FIG. 7 is a graph showing a frequency-Q value relationship.

In FIG. 7, the horizontal axis is the frequency [GHz] and the vertical axis is the Q value. In FIG. 7, the characteristics of the multilayer coil component 1 are indicated by a solid line and the characteristics of the multilayer coil component 100 are indicated by a dashed line. The coil 110 of the multilayer coil component 100 is smaller in inner diameter than the coil 5 of the multilayer coil component 1, and thus the Q value in the multilayer coil component 100 is smaller as illustrated in FIG. 7. In other words, in the multilayer coil component 1, the inner diameter of the coil 5 is increased by the turns 7, 8, 9, and 10 of the coil 5, and thus the Q value can be increased.

Accordingly, the Q value can be improved in the multilayer coil component 1.

In the multilayer coil component 1 according to the present embodiment, each of the first external electrode 3 and the second external electrode 4 is disposed only on the main surface 2*d* of the element body 2. In this configuration, the parasitic capacitance that is formed between the turn 6 and the second external electrode 4 and between the turn 11 and the first external electrode 3 can be reduced.

Accordingly, in the multilayer coil component 1, it is possible to improve the Q value while increasing the self-resonant frequency.

Second Embodiment

Figure 8:
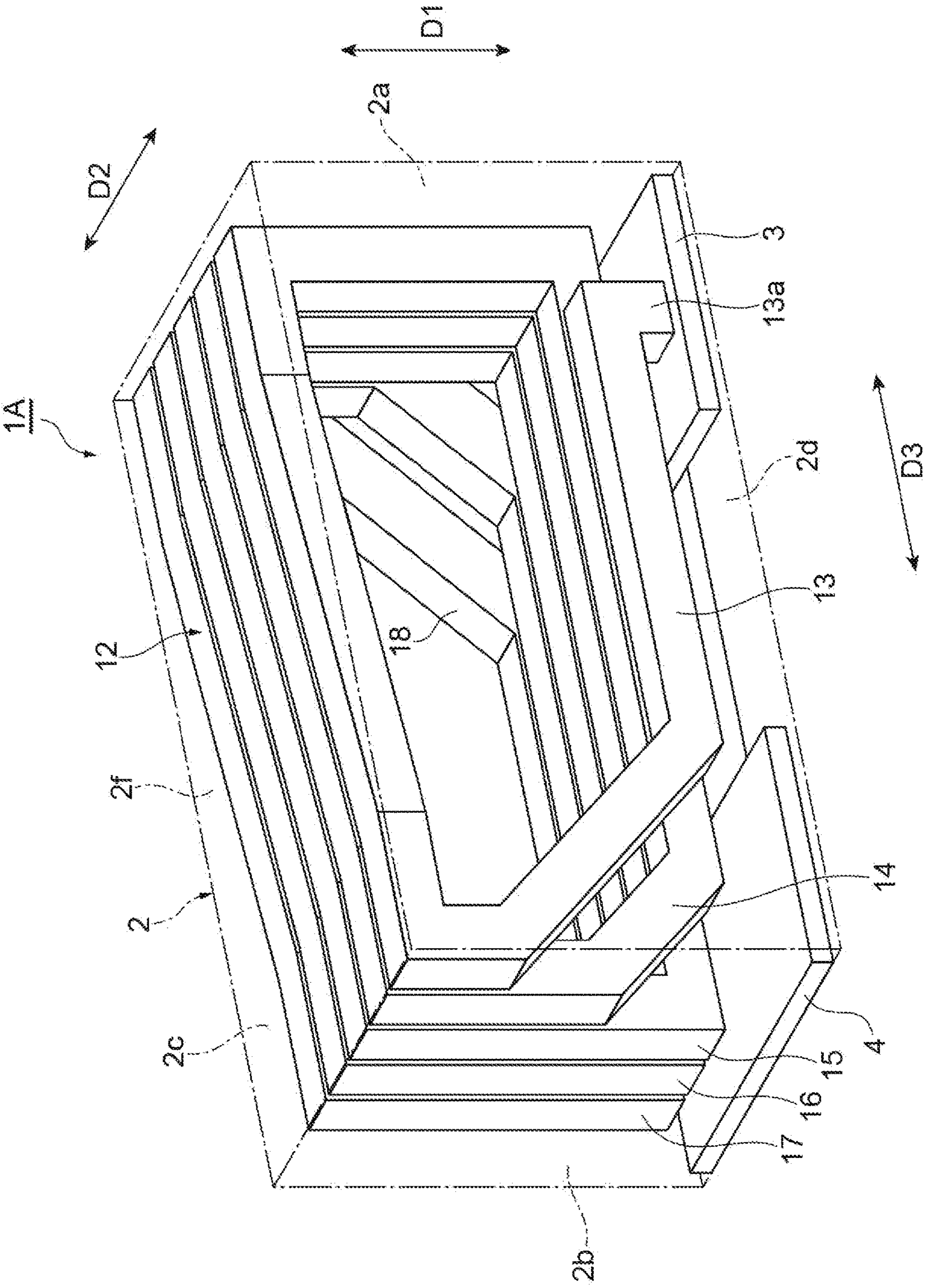
FIG. 8 is a perspective view illustrating the internal configuration of a multilayer coil component according to a second embodiment.

A second embodiment will be described below. As illustrated in FIG. 8, a multilayer coil component 1A includes a coil 12 disposed in the element body 2. A coil axis AX1 of the coil 12 extends along the second direction D2. One end of the coil 12 is connected to the first external electrode 3, and the other end of the coil 12 is connected to the second external electrode 4. The coil 12 is configured to include a plurality of turns 13, 14, 15, 16, 17, and 18. Each of the turns 13, 14, 15, 16, 17, and 18 is formed by a coil conductor (coil portion).

In the coil 12, the turn 13, the turn 14, the turn 15, the turn 16, the turn 17, and the turn 18 are disposed in this order between the side surface 2*e* and the side surface 2*f*. The turn 14, the turn 15, the turn 16, and the turn 17 are disposed between the turn 13 and the turn 18.

Figure 9:
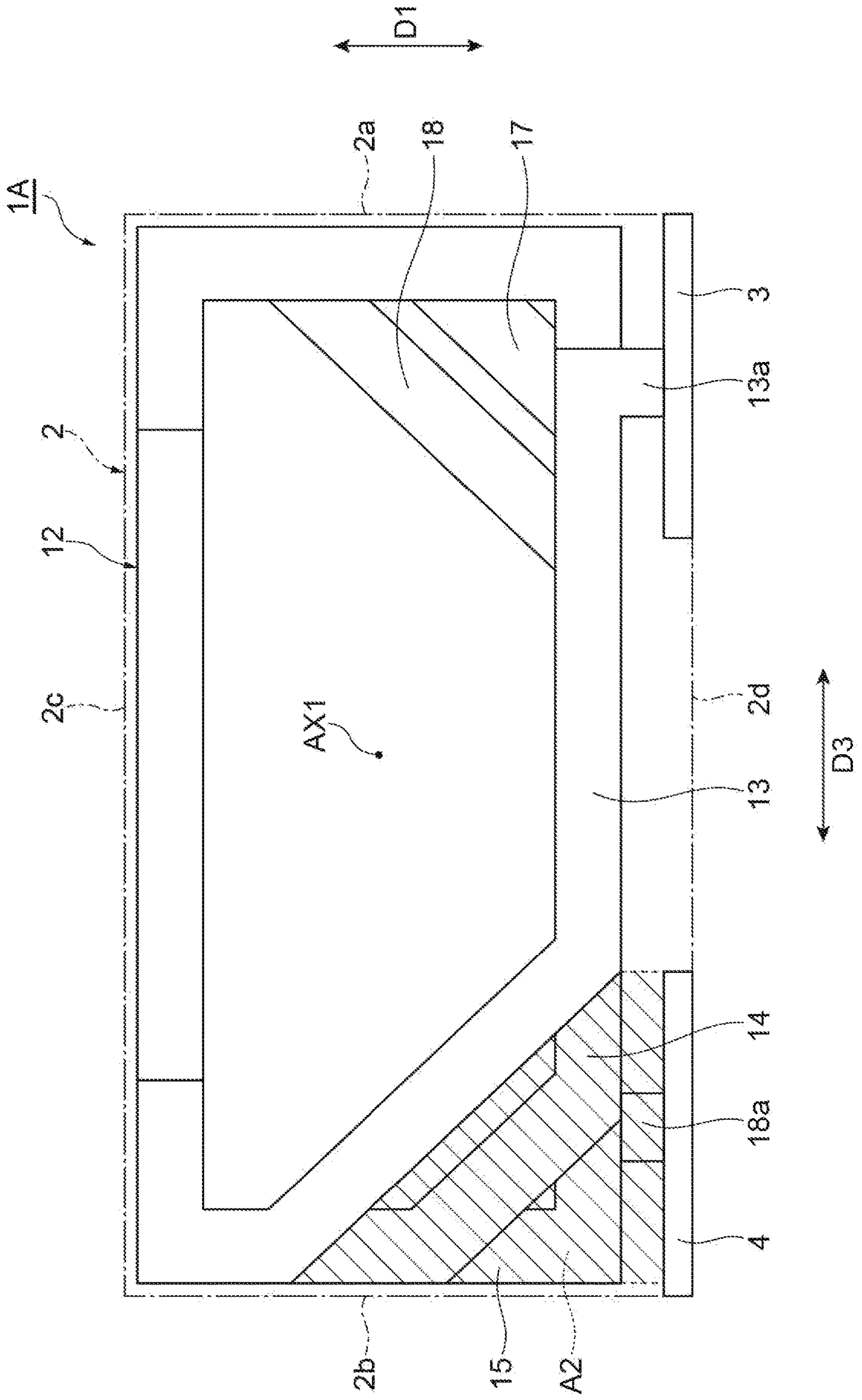
FIG. 9 is a side view illustrating the internal configuration of the multilayer coil component illustrated in FIG. 8.

The turn 13 is the first outermost turn that is closest to the side surface 2*e* in the second direction D2. An end portion 13*a* of the turn 13 is connected to the first external electrode 3. As a result, the coil 12 is connected to the first external electrode 3. As illustrated in FIG. 9, the part of the turn 13 that faces the second external electrode 4 is inclined when viewed from the second direction D2. When viewed from the second direction D2, the part of the turn 13 that faces the second external electrode 4 is inclined upward from the main surface 2*d* toward the end surface 2*b* with the main surface 2*d* side serving as the lower end.

The turn 14 is connected to the turn 13. When viewed from the second direction D2, the part of the turn 14 that faces the second external electrode 4 is inclined. The outer edge of the turn 14 is positioned outside the outer edge of the turn 13 when viewed from the second direction D2. The turn 15 is connected to the turn 14. The turn 16 is connected to the turn 15. The turn 17 is connected to the turn 16. When viewed from the second direction D2, the part of the turn 17 that faces the first external electrode 3 is inclined. The outer edge of the turn 17 is positioned outside the outer edge of the turn 18 when viewed from the second direction D2.

The turn 18 is the second outermost turn that is closest to the side surface 2*f* in the second direction D2. An end portion 18*a* of the turn 18 is connected to the second external electrode 4. As a result, the coil 12 is connected to the second external electrode 4. When viewed from the second direction D2, the part of the turn 18 that faces the first external electrode 3 is inclined. When viewed from the second direction D2, the part of the turn 18 that faces the first external electrode 3 is inclined upward from the main surface 2*d* toward the end surface 2*b* with the main surface 2*d* serving as the lower end.

Figure 10:
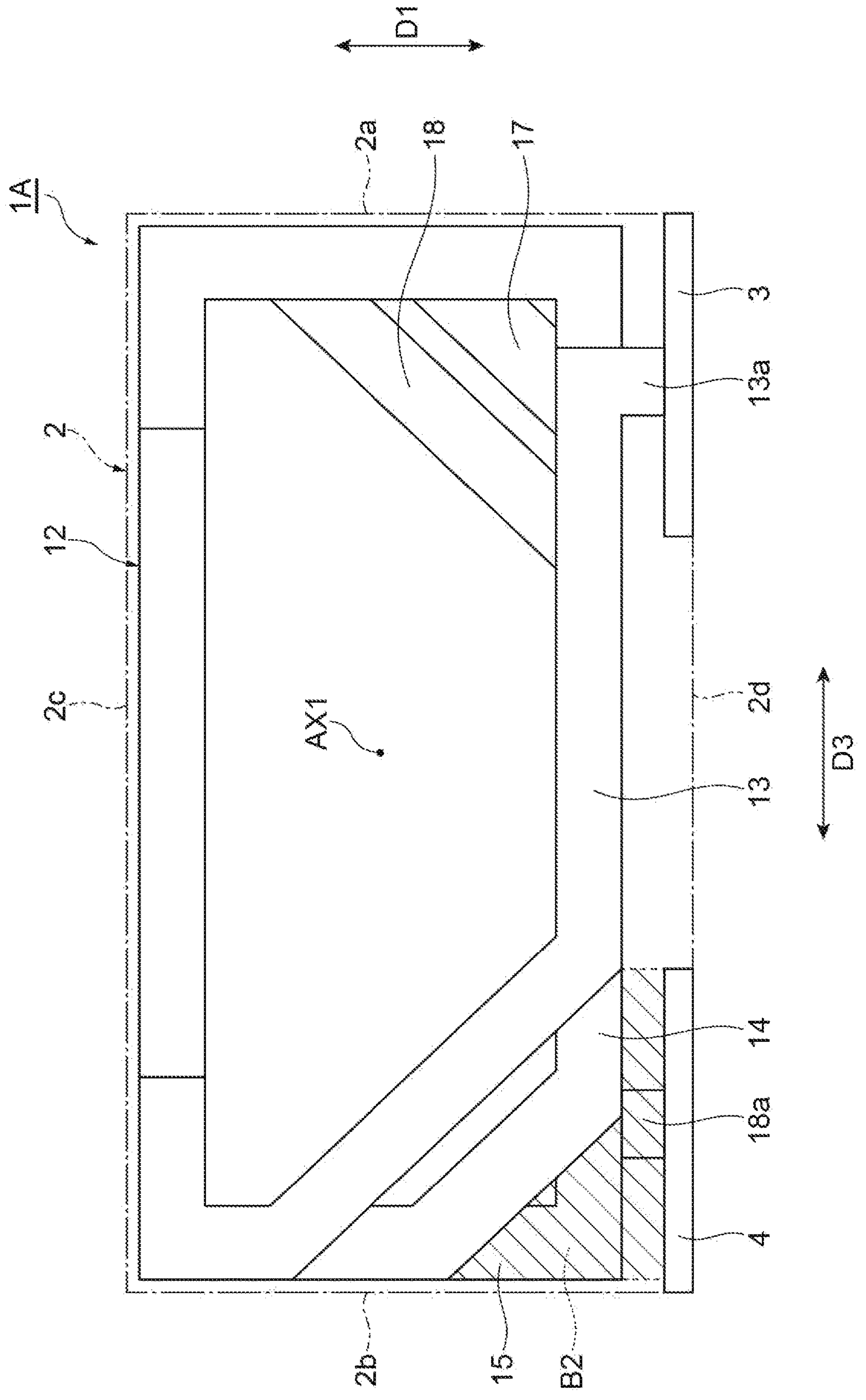
FIG. 10 is a side view illustrating the internal configuration of the multilayer coil component illustrated in FIG. 8.

In the multilayer coil component 1A, the area of the region where the turn 13 and the second external electrode 4 face each other and the area of the region where the turn 18 and the first external electrode 3 face each other are larger than the area of the region where the turns 14, 15, 16, and 17 other than the turn 13 and the turn 18 and the first external electrode 3 or the second external electrode 4 face each other when viewed from the second direction D2. In the multilayer coil component 1A, the relationship of A2>B2 is satisfied in a case where the area of the region where the turn 13 and the second external electrode 4 face each other when viewed from the second direction D2 is "A2" as illustrated in FIG. 9 and the area of the region where the turn 14 and the second external electrode 4 face each other when viewed from the second direction D2 is "B2" as illustrated in FIG. 10.

Likewise, in the multilayer coil component 1A, the relationship of A2>B2 is satisfied in a case where the area of the region where the turn 18 and the first external electrode 3 face each other when viewed from the second direction D2 is "A2" and the area of the region where the turn 17 and the first external electrode 3 face each other when viewed from the second direction D2 is "B2". The same applies to a case where the area of the region where the turns 15 and 16 and the first external electrode 3 or the second external electrode 4 face each other is "B2". In the multilayer coil component 1A, the distance between the turn 13 and the second external electrode 4 in the first direction D1 is greater than the distance between the turns 14, 15, 16, and 17 and the second external electrode 4 in the first direction D1. In other words, the turn 13 is more distant from the second external electrode 4 in the first direction D1 than the turns 14, 15, 16, and 17. In the present embodiment, the distance between the turn 14 and the second external electrode 4 in the first direction D1 is greater than the distance between the turns 15, 16, and 17 and the second external electrode 4 in the first direction D1.

In the multilayer coil component 1A, the distance between the turn 18 and the first external electrode 3 in the first direction D1 is greater than the distance between the turns 14, 15, 16, and 17 and the first external electrode 3 in the first direction D1. In other words, the turn 18 is more distant from the first external electrode 3 in the first direction D1 than the turns 14, 15, 16, and 17. In the present embodiment, the distance between the turn 17 and the first external electrode 3 in the first direction D1 is greater than the distance between the turns 14, 15, and 16 and the first external electrode 3 in the first direction D1.

As described above, in the multilayer coil component 1A according to the present embodiment, the area of the region where the turn 13 (first outermost turn) and the second external electrode 4 face each other and the area of the region where the turn 18 (second outermost turn) and the first external electrode 3 face each other are larger than the area of the region where the turns 14, 15, 16, and 17 other than the turn 13 and the turn 18 and the first external electrode 3 or the second external electrode 4 face each other when viewed from the facing direction of the pair of side surfaces 2*e* and 2*f* (second direction D2). As a result, in the multilayer coil component 1A, the turn 13 and the second external electrode 4 can be separated from each other and the turn 18 and the first external electrode 3 can be separated from each other. Accordingly, in the multilayer coil component 1A, the parasitic capacitance that is generated between the turn 13 and the second external electrode 4 and between the turn 18 and the first external electrode 3 can be reduced. As a result, in the multilayer coil component 1A, it is possible to improve the Q value while increasing the self-resonant frequency.

Third Embodiment

Figure 11:
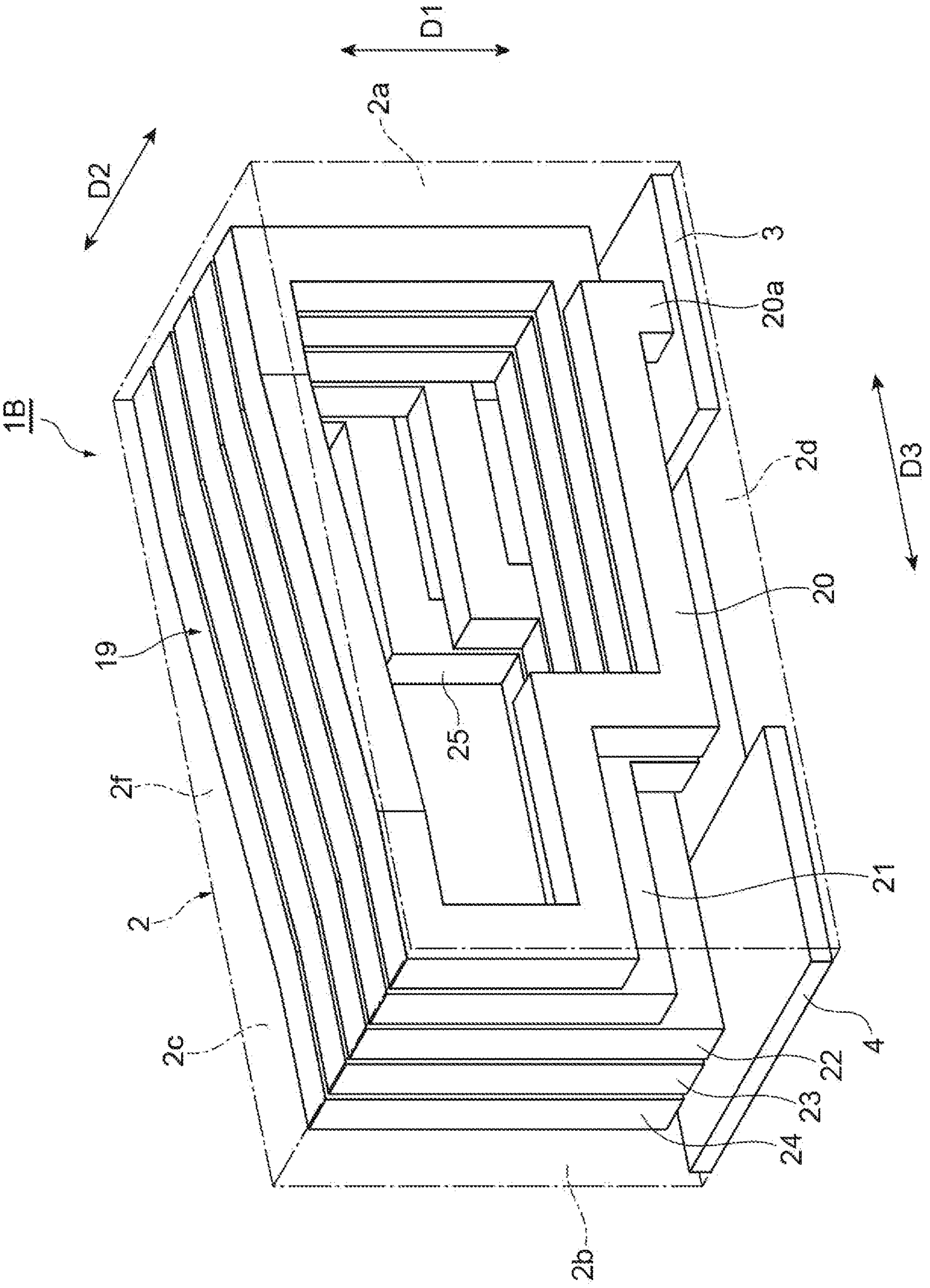
FIG. 11 is a perspective view illustrating the internal configuration of a multilayer coil component according to a third embodiment.

A third embodiment will be described below. As illustrated in FIG. 11, a multilayer coil component 1B includes a coil 19 disposed in the element body 2. A coil axis AX2 of the coil 19 extends along the second direction D2. One end of the coil 19 is connected to the first external electrode 3, and the other end of the coil 19 is connected to the second external electrode 4. The coil 12 is configured to include a plurality of turns 20, 21, 22, 23, 24, and 25. Each of the turns 20, 21, 22, 23, 24, and 25 is formed by a coil conductor (coil portion).

In the coil 19, the turn 20, the turn 21, the turn 22, the turn 23, the turn 24, and the turn 25 are disposed in this order between the side surface 2*e* and the side surface 2*f*. The turn 21, the turn 22, the turn 23, and the turn 24 are disposed between the turn 20 and the turn 25.

The turn 20 is the first outermost turn that is closest to the side surface 2*e* in the second direction D2. An end portion

Figure 12:
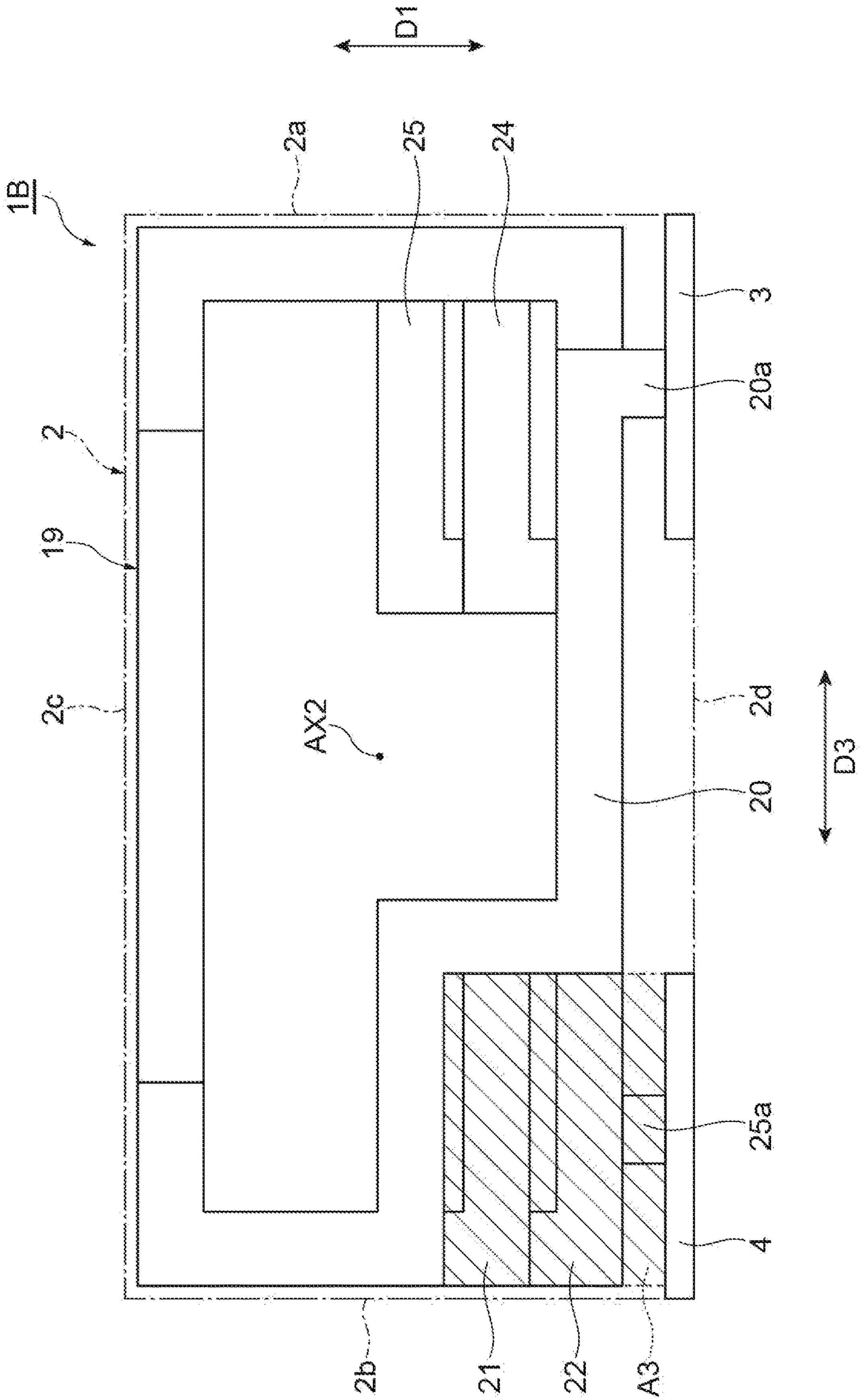
FIG. 12 is a side view illustrating the internal configuration of the multilayer coil component illustrated in FIG. 11.

20*a* of the turn 20 is connected to the first external electrode 3. As a result, the coil 19 is connected to the first external electrode 3. As illustrated in FIG. 12, the part of the turn 20 that faces the second external electrode 4 is a step when viewed from the second direction D2. In other words, when viewed from the second direction D2, the part of the turn 20 that faces the second external electrode 4 has an L shape. The part of the turn 20 that faces the second external electrode 4 is parallel to the second external electrode 4 when viewed from the second direction D2.

The turn 21 is connected to the turn 20. When viewed from the second direction D2, the part of the turn 21 that faces the second external electrode 4 is a step. The outer edge of the turn 21 is positioned outside the outer edge of the turn 20 when viewed from the second direction D2. The turn 22 is connected to the turn 21. The turn 23 is connected to the turn 22. The turn 24 is connected to the turn 23. When viewed from the second direction D2, the part of the turn 24 that faces the first external electrode 3 is a step. The outer edge of the turn 24 is positioned outside the outer edge of the turn 25 when viewed from the second direction D2.

The turn 25 is the second outermost turn that is closest to the side surface 2*f* in the second direction D2. An end portion 25*a* of the turn 25 is connected to the second external electrode 4. As a result, the coil 19 is connected to the second external electrode 4. When viewed from the second direction D2, the part of the turn 25 that faces the second external electrode 4 is a step. In other words, when viewed from the second direction D2, the part of the turn 25 that faces the first external electrode 3 has an L shape. The part of the turn 25 that faces the first external electrode 3 is parallel to the first external electrode 3 when viewed from the second direction D2.

Figure 13:
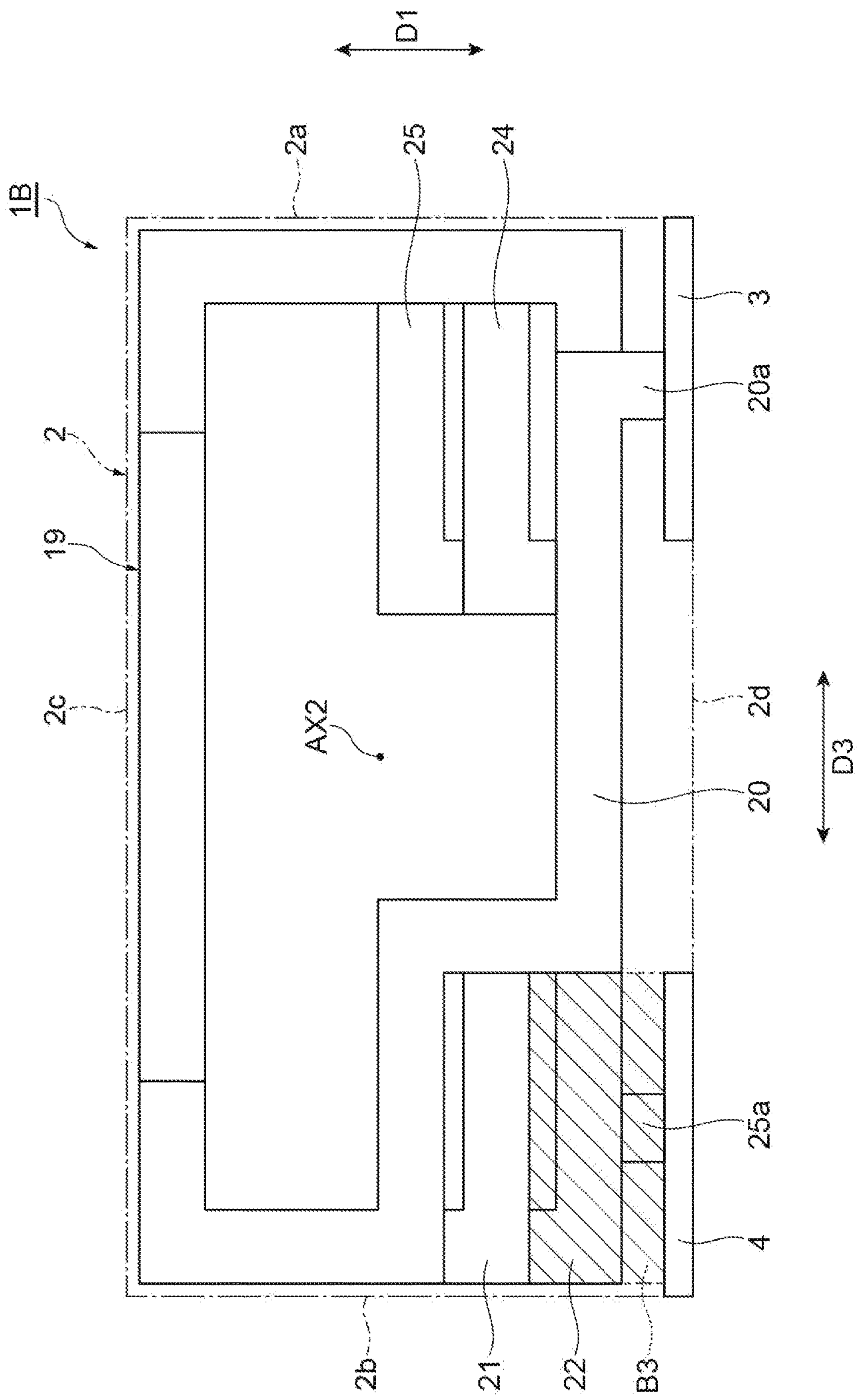
FIG. 13 is a side view illustrating the internal configuration of the multilayer coil component illustrated in FIG. 11.

In the multilayer coil component 1B, the area of the region where the turn 20 and the second external electrode 4 face each other and the area of the region where the turn 25 and the first external electrode 3 face each other are larger than the area of the region where the turns 21, 22, 23, and 24 other than the turn 20 and the turn 25 and the first external electrode 3 or the second external electrode 4 face each other when viewed from the second direction D2. In the multilayer coil component 1B, the relationship of A3>B3 is satisfied in a case where the area of the region where the turn 20 and the second external electrode 4 face each other when viewed from the second direction D2 is "A3" as illustrated in FIG. 12 and the area of the region where the turn 21 and the second external electrode 4 face each other when viewed from the second direction D2 is "B3" as illustrated in FIG. 13.

Likewise, in the multilayer coil component 1B, the relationship of A3>B3 is satisfied in a case where the area of the region where the turn 25 and the first external electrode 3 face each other when viewed from the second direction D2 is "A3" and the area of the region where the turn 24 and the first external electrode 3 face each other when viewed from the second direction D2 is "B3". The same applies to a case where the area of the region where the turns 22 and 23 and the first external electrode 3 or the second external electrode 4 face each other is "B3". In the multilayer coil component 1B, the distance between the turn 20 and the second external electrode 4 in the first direction D1 is greater than the distance between the turns 21, 22, 23, and 24 and the second external electrode 4 in the first direction D1. In other words, the turn 20 is more distant from the second external electrode 4 in the first direction D1 than the turns 21, 22, 23, and 24. In the present embodiment, the distance between the turn 21 and the second external electrode 4 in the first direction D1 is greater than the distance between the turns 22, 23, and 24 and the second external electrode 4 in the first direction D1.

In the multilayer coil component 1B, the distance between the turn 25 and the first external electrode 3 in the first direction D1 is greater than the distance between the turns 21, 22, 23, and 24 and the first external electrode 3 in the first direction D1. In other words, the turn 25 is more distant from the first external electrode 3 in the first direction D1 than the turns 21, 22, 23, and 24. In the present embodiment, the distance between the turn 24 and the first external electrode 3 in the first direction D1 is greater than the distance between the turns 21, 22, and 23 and the first external electrode 3 in the first direction D1.

As described above, in the multilayer coil component 1B according to the present embodiment, the area of the region where the turn 20 (first outermost turn) and the second external electrode 4 face each other and the area of the region where the turn 25 (second outermost turn) and the first external electrode 3 face each other are larger than the area of the region where the turns 21, 22, 23, and 24 other than the turn 20 and the turn 25 and the first external electrode 3 or the second external electrode 4 face each other when viewed from the facing direction of the pair of side surfaces 2*e* and 2*f* (second direction D2). As a result, in the multilayer coil component 1B, the turn 20 and the first external electrode 3 can be separated from each other and the turn 25 and the second external electrode 4 can be separated from each other. Accordingly, in the multilayer coil component 1B, the parasitic capacitance that is generated between the turn 20 and the first external electrode 3 and between the turn 25 and the second external electrode 4 can be reduced. As a result, in the multilayer coil component 1B, it is possible to improve the Q value while increasing the self-resonant frequency.

Although embodiments of the present invention have been described above, the present invention is not necessarily limited to the above-described embodiments and various modifications can be made without departing from the gist of the present invention.

In the above embodiment, a form in which the first external electrode 3 and the second external electrode 4 are disposed on the main surface 2*d* has been described as an example. Alternatively, the first external electrode may be disposed over the end surface 2*a* and the main surface 2*d*. In other words, the first external electrode may have an L shape when viewed from the second direction D2. The same applies to the second external electrode.

In the above embodiment, a form in which each of the first external electrode 3 and the second external electrode 4 is embedded in the element body 2 has been described as an example. Alternatively, each of the first external electrode 3 and the second external electrode 4 may be disposed on the main surface 2*d* of the element body 2.

In the above embodiment, a configuration in which the coil 5 includes the turns 6, 7, 8, 9, 10, and 11 has been described as an example. However, the number of turns constituting the coil is not limited thereto. The same applies to the coil 12 and the coil 19.

What is claimed is:

1. A coil component comprising:

an element body including a pair of end surfaces facing each other, a pair of main surfaces facing each other, and a pair of side surfaces facing each other;

a coil disposed in the element body, having a coil axis extending along a facing direction of the pair of side surfaces, and including a plurality of turns having a constant width; and a first external electrode to which one end of the coil is connected and a second external electrode to which the other end of the coil is connected, wherein each of the first external electrode and the second external electrode is disposed on at least one of the main surfaces and the first external electrode and the second external electrode are separated from each other in a facing direction of the pair of end surfaces, an end portion of a first outermost turn as the turn closest to one of the side surfaces in the facing direction of the pair of side surfaces is connected to the first external electrode and an end portion of a second outermost turn as the turn closest to the other side surface in the facing direction of the pair of side surfaces is connected to the second external electrode, the end portion of the first outermost turn having a first point closest to the one of the side surfaces in the facing direction of the pair of side surfaces, the end portion of the second outermost turn having a second point closest to the other side surface in the facing direction of the pair of side surfaces, an imaginary line extending in the facing direction of the pair of main surfaces and passing through the first point being a first line, an imaginary line extending in the facing direction of the pair of main surfaces and passing through the second point being a second line, and when viewed from the facing direction of the pair of side surfaces, between the first line and the one of the side surfaces in the facing direction of the pair of side surfaces, an area of a region where the first outermost turn and the second external electrode face each other is larger than an area of a region where the turns other than the first outermost turn and the second outermost turn and the second external electrode face each other, and between the second line and the other side surface in the facing direction of the pair of side surfaces, an area of a region where the second outermost turn and the first external electrode face each other is larger than an area of a region where the turns other than the first outermost turn and the second outermost turn and the first external electrode face each other.

2. The coil component according to claim 1, wherein a part where the first outermost turn faces the second external electrode and a part where the second outermost turn faces the first external electrode have a curved shape when viewed from the facing direction of the pair of side surfaces.

3. The coil component according to claim 1, wherein each of the first external electrode and the second external electrode is disposed only on one of the main surfaces.

* * * * *